United States Patent [19]

Okamoto et al.

[11] Patent Number: 5,429,875
[45] Date of Patent: Jul. 4, 1995

[54] MOUNTING OBJECT PROVIDED WITH A METALLIC HEAT-RESISTANT TWO-DIMENSIONAL FASTENER

[75] Inventors: Osamu Okamoto; Teruomi Nakaya, both of Tokyo, Japan

[73] Assignee: National Aerospace Laboratory of Science & Technology Agency, Tokyo, Japan

[21] Appl. No.: 985,660

[22] Filed: Dec. 7, 1992

[30] Foreign Application Priority Data

Jul. 15, 1992 [JP] Japan .................................. 4-209466

[51] Int. Cl.6 ............................. B22F 3/10; B22F 7/00
[52] U.S. Cl. ..................................... 428/547; 24/306; 24/443; 24/444; 24/445; 24/446; 24/580; 24/587; 24/697.1; 24/588; 244/132; 169/900; 428/100
[58] Field of Search ................. 24/306, 444, 443, 445, 24/446, 580, 587, 697.1, 588; 244/132; 269/900; 428/100, 547

[56] References Cited

U.S. PATENT DOCUMENTS

| | | | |
|---|---|---|---|
| 3,643,316 | 2/1972 | Girard et al. | 29/400 |
| 3,913,183 | 10/1975 | Brumlik | 24/204 |
| 3,916,703 | 11/1975 | Ribich et al. | 24/73 P |
| 3,943,981 | 3/1976 | De Brabander | 139/391 |
| 4,344,654 | 8/1982 | Apezynski | 301/37 R |
| 4,709,453 | 12/1987 | Harvey et al. | 24/442 |
| 4,748,915 | 6/1988 | Hastings et al. | 109/2 |
| 4,925,134 | 5/1990 | Keller et al. | 244/158 A |

*Primary Examiner*—Donald P. Walsh
*Assistant Examiner*—Scott T. Bluni
*Attorney, Agent, or Firm*—Armstrong, Westerman, Hattori, McLeland & Naughton

[57] ABSTRACT

A mounting object comprises a combination of a body wherein elements of a metallic heat-resistant two-dimensional fastener in a mounting surface, and their engaging portions projecting therefrom have their base portions embedded and integrally molded, and a mating base object wherein integrally molded mating fastener elements project for detachable engagement with said fastener elements. The mounting object body is formed as a heat-resistant material integral with a metallic two-dimensional fastener by covering and fixing part of the fastener elements of the metallic two-dimensional fastener with a carbon powder having a high melting temperature and covering bases thereof with a metallic powder, a ceramics powder, or a mixture thereof which is molded and sintered.

7 Claims, 3 Drawing Sheets

MOUNTING OBJECT PROVIDED WITH A METALLIC HEAT-RESISTANT TWO-DIMENSIONAL FASTENER

BACKGROUND OF THE INVENTION (1) Field of the Invention

The present invention relates to a mounting object such as a tile, a heat-resistant plate and the like, and more particularly to a mounting object integrally provided with a metallic heat-resistant two-dimensional fastener capable of being detachably mounted on a mounting surface of a structure body.

(2) Description of the Prior Art

Heat-resistant mounting objects mounted on a structure body in order to protect the structure body from high temperatures include a tile, a heat-resistant plate and the like. In the past, mounting of these heat-resistant mounting objects onto the structure body has been carried out by adhesion using cement or other adhesives, fixing using bolts or fixedly mounting using both the methods as just mentioned. The mounting objects cannot be easily mounted and removed after they have been mounted. Therefore, for example, tiles on the ceiling or wall surfaces of a building or structure could not be simply mounted or removed for replacement or rearrangement.

Mounting methods for a heat-resistant mounting object as a heat-proof material mounted on an external surface of spacecraft, for example, a space shuttle so far known include a method using adhesives in case of ceramics tile, a bayonet system in case of a titanium alloy heat-resistant panel wherein clips and tongs mounted on four corners of the rear surface of the panel are fitted to successively connect external panels, and a screw fixing system wherein a face sheet on the airframe side of a panel and the airframe construction are directly connected by use of screws. Further, recently, in the field of spacecraft or the like, a functionally gradient composite heat-resistant material of ceramics and metal has been conspicuously developed. However, a technology in which a functionally gradient composite heat-resistant material and metallic mounting parts are integrated has not yet been proposed, in which case also, the mounting object is mounted on the structure body by either method of said prior art.

As described above, the technology in which a heat-resistant mounting object and mounting parts are integrated and the method for detachably mounting the heat-resistant mounting object on a mounting base or a structure body have not been heretofore known.

In the past, since the heat-resistant mounting object is integrally secured to the structure, a relative displacement between the heat-resistant mounting object and the structure cannot be made. Particularly, in spacecraft used under the severe environment, there involved a great problem in that cracks, peeling and the like occurred due to the thermal expansion strain and vibration of the heat-resistant mounting body. Further, in the space shuttle, the space shuttle is exposed to a high temperature in excess of a heat-resistant temperature of a heat-resistant mounting object for a while due to frictional heat generated when the space shuttle enters the atmosphere. Therefore, a method is employed in which the rear surface of the heat-resistant mounting object is cooled by a coolant in order to protect the airframe from high temperature. This requires extra outfits and brings forth an increase in weight. Moreover, in case of mounting relying on the conventional adhesion system or the like, conductivity between the mounting object and the structure cannot be secured. It was therefore difficult to apply a heat-resistant connection for antenna, electrostatic measures and so on.

SUMMARY OF THE INVENTION

An object of the present invention is to provide a mounting object provided with a metallic heat-resistant two-dimensional fastener in which a mounting object such as a tile and a panel is integrally provided with fastener elements and can be detachably mounted on a mounting surface of a structure.

Another object of the present invention is to provide a plate mounting object provided with a metallic heat-resistant two-dimensional fastener in which a mounting object can be finely displaced with respect to a structure on which said mounting object is mounted and a crack or a peeling, is hard to occur even if a thermal expansion strain or vibration should take place.

A further object of this invention is to provide a heat-resistant mounting object in which a functionally gradient composite heat-resistant material and a metallic heat-resistant two-dimensional fastener are integrated.

A further object of this invention is to provide a heat-resistant plate mounting object which can withstand a high temperature in excess of the design heat-resistant temperature of the heat-resistant plate even if it is temporarily exposed thereto.

A further object of this invention is to provide a heat-resistant plate mounting object provided with a metallic heat-resistant two-dimensional fastener in which a metallic heat-resistant two-dimensional fastener integral with a heat-resistant mounting object is excellent in durability.

A further object of this invention is to provide a manufacturing method capable of simply manufacturing a heat-resistant plate mounting object provided with a metallic heat-resistant two-dimensional fastener, which can achieve the aforementioned objects.

For achieving the aforesaid objects, a mounting object provided with a metallic heat-resistant two-dimensional fastener according to the present invention comprises a mounting object body having metallic fastener elements wherein engaging portions of metallic fastener elements constituting face fasteners are projected outside from a mounting surface and bases are embedded and integrally molded, and a mating fastener element base object provided with projecting mating fastener elements in detachable engagement with said metallic fastener elements.

The mounting object body can be formed of various materials according to applications therefor. When the mounting object body comprises a functionally gradient composite heat-resistant material of ceramics and metal having a surface in the form of a fine ceramics layer, an intermediate in the form of a composite layer wherein fine ceramics are mixed with metal in which metal components gradually increase from said fine ceramics layer, and a rear surface in the form of a metal layer, and fastener elements are embedded and integrally sintered so that engaging portions are projected externally of the rear surface from said metal layer, it is possible to obtain a high function heat-resistant mounting object which can be used under the most severe environment such as a space shuttle.

An upper chemicals layer is provided on the surface of the fine ceramics layer whereby when temporarily exposed to a high temperature in excess of a heat-resistant temperature of a heat-resistant plate, the upper chemical layer advantageously exhibits an effective heat-proof function. When the fine ceramics layer is formed from a porous layer, layers different in density are formed by the fine ceramics layer, the metal layer and the two-dimensional fastener portion to increase a heat insulating effect and a sound-proof effect.

In the case where the heat-resistant mounting object body is a tile formed from ceramics, there is obtained a tile capable of being detachably mounted.

In the case where the heat-resistant mounting object body constitutes a heat-resistant housing casing for housing and holding a jet engine control device and control wiring mounting parts mounted on an armored engine frame of an aircraft, it is possible to simply mount the heat-resistant housing casing on the armored engine frame.

In the heat-resistant mounting object body, a mounting surface and an outer surface of a fastener element projected outside from said mounting surface are coated with a carbon fiber coating layer, or a fastener element is formed from a composite wire material in which an outer peripheral portion of a metallic wire material is coated about a core thereof with a carbon fiber film layer, whereby making it possible to obtain a heat-resistant mounting object which is excellent in heat resistance, prevented from being oxidized and excellent in durability.

Further, according to the present invention, there is provided a method for manufacturing a mounting object provided with a metallic heat-resistant two-dimensional fastener, the method comprising: covering and fixing engaging portions of fastener elements constituting a two-dimensional fastener within a mold form with an inorganic powder, such as carbon powder having a higher melting temperature than said fastener elements, and providing thereon a raw material powder layer for molding a mounting object body to mold it to obtain a mounting object body molded article; sintering said mounting object body molded article at a temperature less than a melting temperature of said inorganic powder layer; and removing the inorganic powder which covers the engaging portions of said fastener elements after cooling, whereby a heat-resistant mounting object body integrally having metallic fastener elements is manufactured.

The mounting object body molded article is constituted by forming a metallic powder layer having a melting temperature substantially equal to the fastener element, a mixed layer of metallic powder and fine ceramic powder, on the metallic powder layer, which is mixed so that a proportion of the metallic powder gradually lowers and the ceramics powder gradually increases, and a fine ceramics layer on the mixed layer, and said heat-resistant mounting object body molded article is sintered at a temperature less than a melting temperature of said inorganic powder layer to thereby obtain a functionally gradient composite heat-resistant body of ceramics and metal.

Another method for manufacturing a mounting object comprises knitting a net having a loop on one surface from a metallic wire material, embedding the net into a ceramics powder with other portions mixed with metal leaving said loop portion to harden it by said ceramics powder, coating a carbon resin on the loop portion and the ceramics surface and sintering it under the atmosphere of inert gas, thereby obtaining a heat-resistant mounting object body in which metallic wire material—carbon fiber and metallic wire material—ceramics are compounded and integrated.

Still another method for manufacturing a heat-resistant mounting object comprises coating a carbon resin in advance on a metallic wire material to sinter it under the atmosphere of inert gas to thereby obtain a metal—carbon fiber wire composite material, knitting a net having a loop on one surface by said metal—carbon fiber composite wire material, embedding the net into a ceramic powder with other portions mixed with metal leaving said loop portion to harden it by said ceramics powder, and sintering the same under the atmosphere of inert gas, thereby obtaining a heat-resistant mounting object body having a metallic wire material—carbon fiber and metallic wire material—ceramics compounded and integrated.

According to the present invention, a mounting object such as a heat-resistant plate in which metallic fastener elements are integrally provided on a mounting surface and a mating fastener element base object are obtained. Therefore, if the mating fastener element base object is fixed to the airframe base on which a mounting object is mounted in a conventional manner, the mounting surface of the mounting object is merely opposed to the mating fastener element base object and pressed in whereby the fastener elements are elastically deformed from each other so that the loops and hooks are engaged to exhibit the function of the two-dimensional fastener, and the mounting object is rigidly secured to the airframe base. Accordingly, the mounting can be done in a short time and simply without requiring particular precise locating, screwing or adhesion. In removal of the mounting object, it can be forcibly peeled off against the resilient force of the loops and hooks. The mounting portion has a slight freedom because of the two-dimensional fastener. Thermal expansion strain or vibration of the base and the mounting object can be absorbed, thus preventing the mounting object from being disengaged or from being cracked.

The mounting object and the mating fastener element base object are sintered in the state where the engaging portions of the fastener elements are coated with the heat-resistant protecting carbon powder higher in melting temperature than the fastener elements in the process of manufacture. Therefore, the metal of the fastener elements becomes bonded with the coated carbon so that the surface becomes hardened, and the surface is prevented from being oxidized since it is heated under the state of no oxygen, thus obtaining fastener elements which are excellent in durability.

In the case where the aforementioned mounting object is a heat-resistant plate to be mounted on the surface of a space shuttle, high-temperature upper chemicals are coated on the surface of the heat-resistant plate whereby even if the heat-resistant plate is temporarily heated to a level above a heat-resistant temperature, heat is absorbed by the fact that the upper chemicals are baked by the high temperature to enhance the heat resistance. Accordingly, a heat-resistant construction is obtained without cooling the rear surface by a coolant as in prior art. Furthermore, when the color temperature displaying upper chemicals are coated on the lower portion of the high temperature upper chemicals layer, color appears due to the heat at that time, and a degree of temperature rise is displayed by the color.

Moreover, since the fastener elements are made of metal, the conductivity between the heat-resistant plate and the base, which has been impossible to secure it in the conventional adhesive type heat-resistant plate, can be secured.

When a metallic wire material for fastener elements is formed from a composite wire material in which an outer peripheral surface of the metallic wire material is coated with a carbon fiber or the like, the metallic wire material is prevented from being oxidized to enable use for a long period with high strength and enable adjustment of a spring function of a wire material.

DESCRIPTION OF THE PREFERRED EMBODIMENTS

Figure 1:
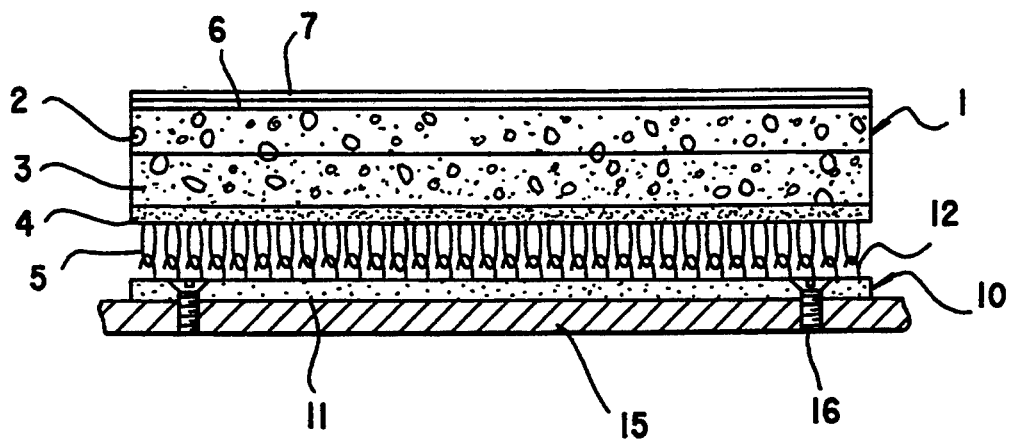
FIG. 1 is a schematic sectional view showing a state in which a heat-resistant mounting object provided with a metallic two dimensional fastener according to an embodiment of the present invention is mounted on a structure body.

FIG. 1 is a sectional view showing a state in which a heat-resistant mounting object provided with a metallic heat-resistant two-dimensional fastener according to an embodiment of the present invention is mounted on a structure body.

In the present embodiment, there is shown an embodiment in which a heat-resistant mounting object is applied to a heat-resistant plate (a heat-resistant tile) as a heat-proof material capable of being detachably mounted on the outer surface of a space shuttle. The heat-resistant plate 1 constituting a heat-resistant mounting object body comprises a functionally gradient composite heat-resistant material of ceramics and metal including a surface principally formed from a ceramics layer 2, a rear surface as a mounting surface formed from a metallic layer 4 and an intermediate formed from a composite layer 3 formed of ceramics and metal. Bases of fastener elements 5 of either loop side or hook side (the loop side in the present embodiment) constituting a metallic heat-resistant two-dimensional fastener are embedded in and integrally molded in the metallic layer 4 as the mounting surface. Temperature displaying upper chemicals 6 which exhibit a selected color upon being subject to a temperature are coated partly or wholly on the surface of the ceramics layer 2, and high temperature upper chemicals 7 is further coated thereon over the whole surface of the heat-resistant plate. The high temperature upper chemicals play a role to absorb heat during the process of being baked by frictional heat generated when the space shuttle enters the atmosphere, in order to temporarily impede a heat transfer into the heat-resistant plate and protect the interior of the space shuttle from higher temperature than the performance of the heat-resistant plate.

Reference numeral 10 designates a mating fastener element base object mounted on the structure body, in which bases of other fastener elements (mating fastener elements) in engagement with the fastener elements 5 of the two dimensional fastener are embedded in and integrally molded in a metallic powder sintered object 11. The mating fastener element base object 10 is secured to the body base 15 of a space shuttle by means of bolts 16 or the like.

The method of manufacturing the thus configured heat-resistant plate will be described hereinbelow.

Figure 2:
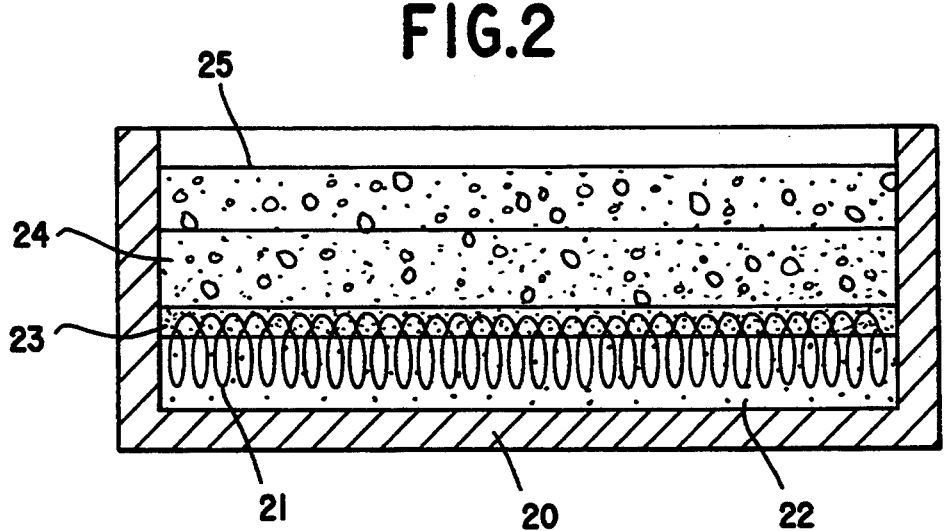
FIG. 2 is a schematic sectional view showing the steps of molding a heat-resistant mounting object body of the heat-resistant mounting object shown in FIG. 1.

As shown in FIG. 2, inserted into a mold form 20 are a helical coil-like metallic wire material 21 formed of titanium or stainless material which constitutes a fastener element on the loop side of a metallic two-dimensional fastener and then an inorganic powder 22 such as a carbon powder having a higher melting temperature than that of said metallic wire material so as to cover approximately ¾ to ¼ of the helical coil-like metallic wire material. A metallic powder 23 having a melting temperature substantially equal to that of said metallic wire material, a mixed powder 24 of fine ceramics powder and said metallic powder and a ceramics powder 25 are further inserted therein to form layers and fixed and dried by a wet type process. Subsequently, when it is put into a sintering oven and sintered by heating and pressing at a temperature less than a melting point of said inorganic powder 22, the wire material portion covered with the carbon powder which is high in the heat-resistant melting temperature is melted but the portion in contact with the metallic powder assumes a state where the wire material and the metallic powder become integrated. Accordingly, when the inorganic powder 22 is removed after cooling, approximately ¼ to ¾ on one side of the helical coil-like metallic wire material portion becomes integrated with the metallic layer to obtain a heat-resistant mounting object body formed from the functionally gradient composite heat-resistant material 1 of ceramics and metal in which the loop-like fastener elements 12 are projected from the mounting surface.

Figure 3:
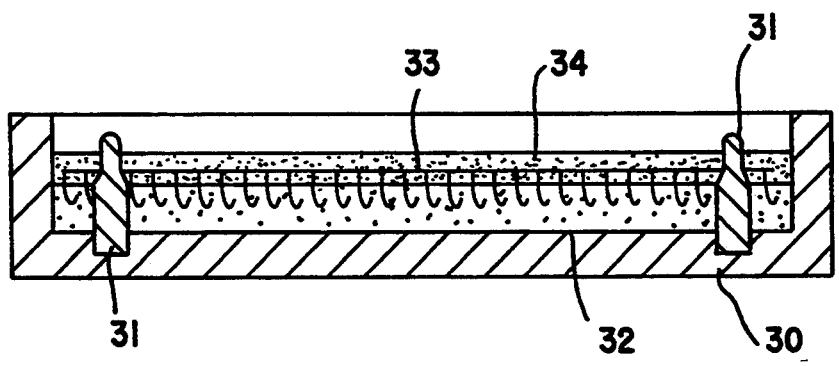
FIG. 3 is a schematic sectional view showing the steps of molding a base object for mating fastener elements of the heat-resistant mounting object shown in FIG. 1.

Next, the mating fastener element base object 10 is manufactured in the following manner. As shown in FIG. 3, a desired quantity of inorganic powder 32 such as carbon powder, is inserted into mold form 30 in which mounting hole molds 31 for forming mounting holes to the airframe base are suitably arranged, a fastener element 33 on the hook side is then placed and the hook portion is embedded into the carbon powder and fixed, in which state, a metallic powder 34 is inserted so as to form a predetermined thickness, which is put into a sintering oven to sinter the metallic powder at a melting temperature of said carbon powder or less, and the inorganic powder 32 is removed after cooling. Thereby, there is obtained a mating fastener element base object 10 in which metallic hooks are projected from the metallic layer and integrally formed.

In the process of manufacturing the heat-resistant mounting object body and the mating fastener element base object, both the heat-resistant mounting body and the mating fastener element base object are sintered in the state where the engaging portion (the loop portion or the hook portion) of the fastener elements is covered with and fixed by the heat-resistant protecting carbon powder having a higher melting temperature than that of said engaging portion. With this, metal of the fastener element becomes bonded with the carbon to harden the surface, and the surface is heated in a state where no oxygen is present, thus preventing the surface from being oxidized. An excellent fastener element is obtained.

In the case where the heat-resistant mounting object configured, as described above is mounted on the space shuttle, the mating fastener element base object 10 is fixed in advance to the airframe base 15 of the space shuttle by means of the bolts 16 and the heat-resistant material 1 is merely forced in while adjusting the mating fastener elements of the mating fastener element base object 10 to the fastener elements 5 of the heat-resistant material 1 whereby these fastener elements are mutually elastically deformed and the loop and the hook are engaged to exhibit the function of the two-dimensional fastener, as a consequence of which the heat-resistant material 1 is firmly secured to the airframe base 15.

When the heat-resistant material 1 is removed, the heat-resistant material 1 is easily removed by forcibly separating it against the resilient force of the loop and the hook. Accordingly, handling is easy. Moreover, being the two-dimensional fastener, the mounting portion has some freedom, and a thermal expansion strain or vibration in the base or the heat-resistant material, if present, can be absorbed, thus making it possible to prevent the heat-resistant material from being disengaged or being cracked.

When the space shuttle enters the atmosphere, the surface temperature of the heat-resistant material is approximately 2000° C. due to the frictional heat so that the heat-resistant material is exposed to a higher temperature than the design temperature though for a short time. In the present embodiment, however, since the high temperature upper chemicals 7 are coated on the surface of the heat-resistant material, the high temperature upper chemicals 7 coated on the surface is, at this time, baked by the frictional heat to thereby absorb heat so that the heat resistance is enhanced. The high temperature upper chemicals 7 become transparent by being baked, and the color temperature displaying upper chemicals 6 provided under the high temperature upper chemicals layer is colored by the heat to which it is subjected at that time so that a degree of elevated temperature is displayed by the color and observed from the surface of the heat-resistant material. The degree of use under high temperature conditions of the heat-resistant material is determined to provide a guideline of evaluation for the time of replacement. In the past, the heat-resistant material elements have been replaced every return from the space whereas according to the present embodiment, the presence or absence of the necessity of replacement can be judged by the color temperature display of each individual heat-resistant material, and only necessary ones may be replaced. Further, in replacement, the heat-resistant material can be merely removed and replaced in a simple manner. Desired characters or marks are depicted by the color temperature displaying upper chemicals whereby when the space shuttle returns to the earth, the marks or characters can be surfaced and displayed.

Further, since the fastener element of the present invention is made of metal, conductivity between the heat resistant material and the base which has been impossible in the conventional adhesive type heat-resistant material can be secured. Electrostatic measures and the like can be easily made, and the heat-resistant connection for antenna and the like can be provided.

While in the above-described embodiment, the metallic wire material of the fastener element projects in its engaging portion as it is, it is to be noted that the outer peripheral surface of the metallic wire material is formed from a composite wire material covered with carbon fibers, or the like, to thereby prevent the metallic wire material from being oxidized to enable use of it with high strength for a long period of time and enable adjustment of a spring function of the wire material. FIGS. 4 to 8 show such embodiments.

Figure 4:
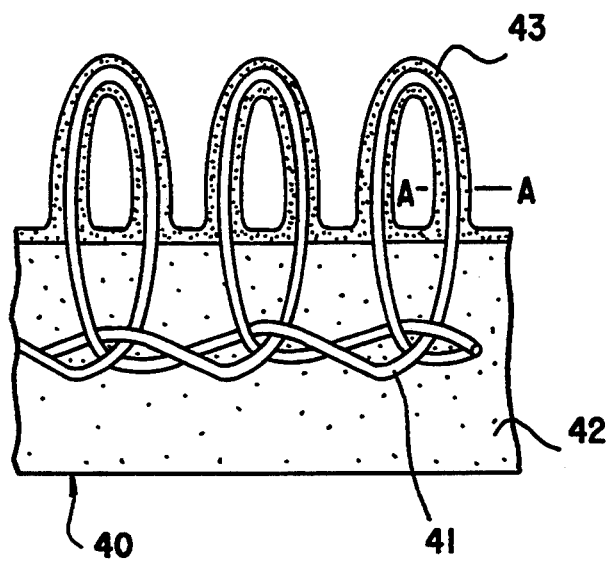
FIG. 4 is a sectional view of a principal portion of a heat-resistant mounting object body according to a further embodiment of the present invention.
Figure 5:
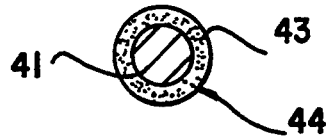
FIG. 5 is a sectional view taken on line A-A of FIG. 4.

FIG. 4 shows an embodiment in which a heat-resistant mounting object is a ceramics tile. In this embodiment, a metallic wire material 41 constituting fastener elements is knitted so that loops are formed on one side at equal pitches and embedded and hardened in a ceramics powder 42 having metal mixed therein with part of the loops exposed. The loops exposed from a ceramics powder layer and a film layer 43 with the surface of a ceramics powder layer coated with carbon resin or the like are formed, which is sintered under the atmosphere of inert gas whereby a metallic wire material—carbon fiber and a metallic wire material—ceramics are compounded and integrated to obtain a two-dimensional fastener composed of a composite wire material 44 in which a metallic wire material is coated with carbon fiber as shown in section of FIG. 5.

As described above, according to the present embodiment, since the surface of the ceramics tile and the fastener element have a film layer of carbon fiber, a ceramics tile 40 excellent in heat resistance and a fastener element excellent in durability are obtained.

Figure 6:
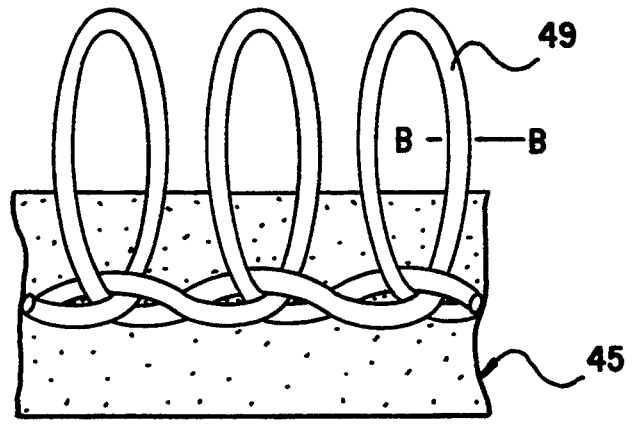
FIG. 6 is a sectional view of a principal portion of a heat-resistant mounting object body of a heat-resistant mounting object according to another embodiment of the present invention.
Figure 7:
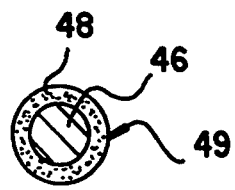
FIG. 7 is a sectional view taken on line B-B of FIG. 6.

FIG. 6 shows a further embodiment in which a mounting object is a ceramics tile. In this embodiment, a metallic wire material 46 is coated in advance with carbon resin, or the like, and sintered under the atmosphere of inert gas to prepare a composite wire material 49 having a film layer 48 of carbon fiber having a section similar to the aforementioned embodiment as shown in FIG. 7. A net is knitted with the fibers by a weaving process by which loops are formed on one side similarly to the aforementioned embodiment, and a ceramics tile 45 provided with a metallic two-dimensional fastener is obtained in a manner similar to the aforementioned embodiment.

Figure 8:
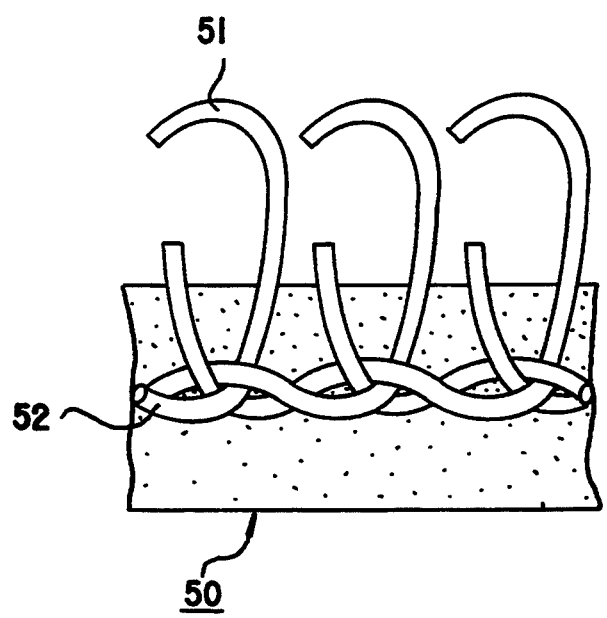
FIG. 8 is a front view in section of a base object for mating fastener elements of a heat-resistant mounting object according to still another embodiment of the present invention.

FIG. 8 shows another embodiment of a mating mounting element base object paired with the ceramics tile shown in FIG. 6. In a mating fastener element base object 50 in the present embodiment, the base is formed of ceramics, and fastener elements 51 on the hook side are provided. The fastener element in the present embodiment also employs a composite wire material 52 having a film layer of carbon fiber similar to the embodiment shown in FIG. 7. In this embodiment, a net is knitted similarly to the above-described embodiment, and thereafter, a part on one side of the loop portion is cut to provide a hook. Thereby, a heat-resistant mounting object provided with a metallic heat-resistant two dimensional fastener can be molded by one kind of mold.

Figure 9:
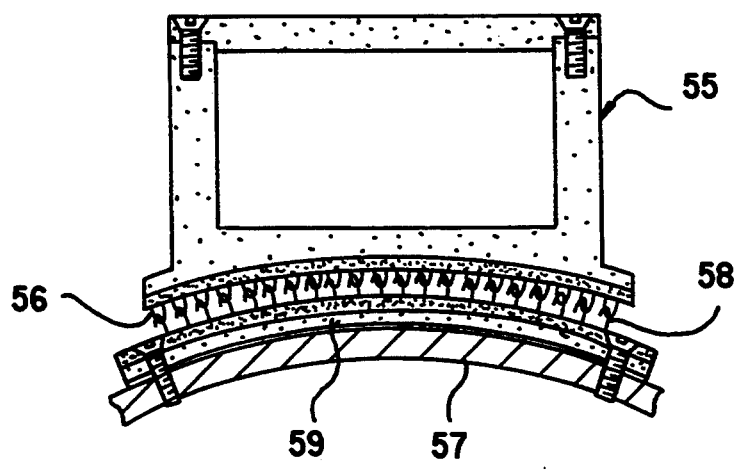
FIG. 9 is a schematic sectional view showing a state in which a heat-resistant housing casing according to another embodiment of the present invention is mounted on an armored engine frame.

FIG. 9 shows an embodiment in which a mounting object provided with a metallic heat-resistant two-dimensional fastener according to the present invention is a heat-resistant housing casing for housing and holding an engine control device for a jet engine and control wiring mounting parts of aircrafts.

Generally, in the engine control device for supplying and controlling fuel to the jet engine, it is desirable in terms of efficiency to control the rotation of the engine at real time. Therefore, the engine control device is mounted on an armored engine frame nearest to a fuel jet in a narrow place within an engine fare ring. Since that mounting place is always subject to high temperatures and high vibrations, a honey-comb laminated material having heat cutoff and vibration proof functions and a material such as heat-resistant rubber have been combined and the engine control device is mounted. However, this is not sufficient to protect wirings or the like from high temperatures and high vibrations to greatly influence on a computer circuit and the like within the control device.

In the present embodiment, a heat-resistant housing casing 55 for the engine control device formed of a metal—ceramics composite heat-resistant material is directly integrally provided with metallic face fastener elements 56 similar to the above-described embodiment and mounted on a mating fastener element base object 59 provided with fastener elements 58 on the hook side secured to an armored-engine frame 57. The heat-resistant housing casing 55 for the engine control device has its mounting surface which is curved and in the form of a box adjusting to the shape of the armored engine frame 57. However, the manufacturing method is similar to that of the above-described embodiment except that the shape is different, and the detailed explanation will be omitted.

Since the heat-resistant housing casing 55 for the engine control device according to the present embodiment is not frequently mounted and removed, the metallic wire material constituting a two dimensional fastener is formed to have a slightly larger diameter to thereby enable improvement of the mounting effect withstanding high temperatures and high vibrations. Further, wirings are encased in a tubular wiring mounting body to thereby enable protection of the wirings from high heat or temperature and high vibrations.

While in the foregoing, the embodiments of the present invention have been described, it is to be noted that the present invention is not limited to these embodiments but the invention can be applied to various changes in design and applications.

For example, while in the above-described embodiment, the two-dimensional fastener elements of the metallic heat-resistant two-dimensional fastener are loop-like on the mounting object side, it is to be noted of course that they may be hook-like on the mounting object side. Further, the engagement of the fastener elements of the two-dimensional fastener is not always limited to a combination of hook- and loop-like configurations but shapes thereof can be variously changed. In an application which does not require a powerful mounting force, for example, a combination of mushroom- and loop-like configuration, a combination of hook- and napping-like configurations or a combination of mushroom- and napping-like configurations may also be employed.

Furthermore, materials for the mounting object can be variously changed. In addition, as for applications, if the mounting object is applied to not only air space instruments but also a ceiling, wall tiles or the like of a kitchen, for example, anybody can freely replace tiles without requiring an expert skill, and repairs and rearrangement can be carried out. Moreover, since an air layer in which a two-dimensional fastener is located is formed between the mounting object and the mounting base side, a sound-proof effect is excellent. Accordingly, if the mounting object is integrated with a porous ceramics plate, detachable sound-proof and heat-resistant walls can be obtained.

What is claimed is:

1. A mounting object having a metallic heat-resistant two-dimensional fastener comprising, in combination:
   a molded mounting object body formed of moldable powdery raw material having a layer defining a mounting surface,
   first fastener elements of a two-dimensional fastener formed of a metallic heat-resistant material, said first fastener elements having base portions embedded and integrally molded in said raw material to be integrated therewith and fastening potions projecting from said mounting surface; and
   a mating fastener element base object having second fastener elements projecting therefrom in detachable engagement with said first fastener elements.

2. A mounting object provided with a metallic heat-resistant two-dimensional fastener according to claim 1, wherein said mounting object body comprises a functionally gradient composite heat-resistant material of ceramics and metal having a portion including an exposed surface in the form of a fine ceramics layer, an intermediate portion in the form of a composite layer containing a component mixture of fine ceramics and metal powder wherein the component of metal powder gradually increases in said mixture from said fine ceramics layer, and a rear portion in the form of a metal layer, and bases of said first fastener elements being embedded and integrally sintered in said metal layer with their engaging portions projecting externally from said metal layer.

3. A mounting object provided with a metallic heat-resistant two-dimensional fastener according to claim 1, wherein said mounting object body comprises a tile formed of ceramics.

4. A mounting object provided with a metallic heat-resistant two-dimensional fastener according to claim 1, wherein said mounting object body comprises a heat-resistant housing casing for housing and holding a jet engine control device and control wiring mounting parts is mounted disposition on an armored engine frame of an aircraft.

5. A mounting object provided with a metallic heat-resistant two-dimensional fastener according to any of claims 1, 2, 3 or 4, including a carbon resin layer on said mounting object body coating said mounting surface and engaging portions of the first fastener elements projecting from said mounting surface.

6. A mounting object provided with a metallic heat-resistant two-dimensional fastener according to any of claims 1, 2, 3 or 4, wherein one of said fastener elements comprises a helical coil-like metallic wire material forming a loop of a two-dimensional fastener, and the other of said fastener elements comprises a metallic hook.

7. A mounting object provided with a metallic heat-resistant two-dimensional fastener according to any of claims 1, 2, 3 or 4, wherein said fastener elements are formed from a composite wire material having a core and an outer peripheral portion of said core being coated with a carbon fibrous film layer.

* * * * *